United States Patent
Bardosy et al.

(10) Patent No.: US 10,856,516 B2
(45) Date of Patent: Dec. 8, 2020

(54) MILKING CLAW

(71) Applicant: TECHNOLOGIES HOLDINGS CORP., Houston, TX (US)

(72) Inventors: Gregory S. Bardosy, Madison, WI (US); Anthony P. Spaeth, Boyd, WI (US); David J. Luzader, Cleveland, TN (US)

(73) Assignee: TECHNOLOGIES HOLDINGS CORP., Houston, TX (US)

( * ) Notice: Subject to any disclaimer, the term of this patent is extended or adjusted under 35 U.S.C. 154(b) by 374 days.

(21) Appl. No.: 16/006,295

(22) Filed: Jun. 12, 2018

(65) Prior Publication Data

US 2019/0373841 A1 Dec. 12, 2019

(51) Int. Cl.
*A01J 5/00* (2006.01)
*A01J 11/04* (2006.01)

(52) U.S. Cl.
CPC .............. *A01J 5/00* (2013.01); *A01J 11/04* (2013.01)

(58) Field of Classification Search
CPC .............. A01J 5/00; A01J 11/04; A01J 5/041
See application file for complete search history.

(56) References Cited

U.S. PATENT DOCUMENTS

| | | | | |
|---|---|---|---|---|
| 4,253,419 A * | 3/1981 | Yang | ...... | A01J 7/005 119/14.54 |
| 4,537,152 A * | 8/1985 | Thompson | ...... | A01J 5/041 119/14.54 |
| 4,807,566 A * | 2/1989 | Chowdhury | ...... | A01J 5/041 119/14.55 |
| 5,291,853 A * | 3/1994 | Steingraber | ...... | A01J 5/041 119/14.54 |
| 6,006,695 A * | 12/1999 | Gustafsson | ...... | A01J 5/041 119/14.54 |
| 6,058,880 A * | 5/2000 | Gustafsson | ...... | A01J 5/041 119/14.54 |
| 6,298,807 B1 * | 10/2001 | Terwilleger | ...... | A01J 5/041 119/14.16 |

(Continued)

FOREIGN PATENT DOCUMENTS

| | | |
|---|---|---|
| EP | 1588607 A1 | 10/2005 |
| WO | 9423662 A1 | 10/1994 |
| WO | 2012036527 A1 | 3/2012 |

OTHER PUBLICATIONS

Patent Cooperation Treaty, International Search Report and Written Opinion, International Application No. PCT/US2019/035482, dated Sep. 13, 2019, 14 pages.

*Primary Examiner* — Trinh T Nguyen
(74) *Attorney, Agent, or Firm* — Andrus Intellectual Property Law, LLP

(57) ABSTRACT

A milking claw for efficiently drawing milk is disclosed. The milking claw includes a claw top and a claw bottom. The claw top includes a pair of front inlets, a pair of rear inlets, and an outlet. The front inlets and the rear inlets extend upwardly from a top surface of the claw top and are spaced on opposite sides of a longitudinal axis of the claw top. The outlet includes an air channel along a direction parallel to the longitudinal axis and a flow passage disposed below the air channel. The flow passage includes a horizontal portion and a vertical portion. The claw bottom is disposed below the claw top and includes a dividing wall, a sump, and a raised knob disposed within the sump.

18 Claims, 4 Drawing Sheets

(56) References Cited

U.S. PATENT DOCUMENTS

| | | | |
|---|---|---|---|
| 6,981,468 B1 * | 1/2006 | Steingraber | A01J 5/041 |
| | | | 119/14.54 |
| 7,021,239 B2 | 4/2006 | Steingraber et al. | |
| 2005/0229858 A1 * | 10/2005 | Steingraber | A01J 5/041 |
| | | | 119/14.54 |

* cited by examiner

MILKING CLAW

TECHNICAL FIELD

This disclosure relates generally to dairy equipment, and more particularly to a milking claw.

BACKGROUND

It is desirable to increase milking efficiency from a milking system. However, current milking systems have proven inefficient in increasing milking capacity. For example, some milking systems are designed in a way that allows slugs of milk to create fluctuation of pressure inside the milking systems. The fluctuation of pressure inside the milking systems slows down the milk flowing from the milking systems, thus decreasing the efficiency of the milking systems.

SUMMARY

Current milking systems or apparatuses have proven inefficient in milking capacity and it is desirable to increase the milking efficiency of the milking systems. For example, some milking apparatuses are designed in a way so that milk would completely block the outlet of the milking apparatuses. This would reduce the air flow in the milk line connected to the outlet and thus creates milk slugs in the milk line. The milk slugs in the milk line create fluctuations of pressure inside the milk line which further creates fluctuations of pressure differential between the milking apparatuses and the milk line. The fluctuation of pressure differential between the milking apparatuses and the milk line causes milk to be drawn from the milking apparatuses in higher volume but less frequent slugs. The higher volume but less frequent slugs in turn slow down the milk flowing from the milking apparatuses to the milk line, thereby decreasing the milking efficiency of the milking apparatuses.

According to embodiments of the present disclosure, disadvantages and problems associated with previous milking systems may be reduced or eliminated.

In some embodiments, a claw top includes a pair of front inlets, a pair of rear inlets, and an outlet. The pair of front inlets are disposed on a top surface of the claw top and configured to draw milk into the claw top. The pair of front inlets extend upwardly from the top surface of the claw top and are inclined towards a front half of the claw top. The pair of front inlets are spaced on opposite sides of a longitudinal axis of the claw top. The pair of rear inlets are disposed on the top surface of the claw top and configured to draw milk into the claw top. The pair of rear inlets extend upwardly from the top surface of the claw top and are inclined towards a rear half of the claw top. The pair of rear inlets are spaced on opposite sides of the longitudinal axis of the claw top. The outlet is disposed at the rear half of the claw top. The outlet includes an air channel and a flow passage. The air channel is positioned along a direction parallel to the longitudinal axis and configured to draw air out of the claw top. The flow passage is disposed below the air channel and configured to draw milk out of the claw top. The flow passage includes a horizontal portion and a vertical portion. The horizontal portion is parallel to the air channel, and the vertical portion is perpendicular to the horizontal portion.

In some embodiments, a claw bottom includes a dividing wall, a sump, and a raised knob. The dividing wall is disposed on an inner surface of a front half of the claw bottom. The dividing wall extends through the front half of the claw bottom towards a center of the claw bottom. The sump is disposed on an inner surface of a rear half of the claw bottom. The raised knob is disposed in an area within the sump and extends upwardly.

In some embodiments, a milking claw includes the claw top and the claw bottom as described above. The claw bottom is disposed below the claw top. The milking claw is configured so that the sump of the claw bottom is positioned partially below the vertical portion of the flow passage of the claw top. Further, the raised knob of the claw bottom is configured to extend upwardly at least partially into the vertical portion of the flow passage.

Certain embodiments of the present disclosure may provide one or more technical advantages. For example, the air channel in the outlet of the claw top is configured to draw air from the milking claw into a milk line connected to the outlet to maintain vacuum stability in the milking claw. Because the air channel draws air from the milking claw into the milk line, the milk slugs in the milk line may be reduced or even eliminated to maintain a constant pressure differential between the inside of the milking claw and the outside of the milking claw. The constant pressure differential forces the milk out of the outlet in smaller, more frequent slugs of milk as opposed to higher volume less frequent slugs, so that milk flows more smoothly and more steadily. This more frequent taking away of the milk creates a more stable vacuum inside milking the claw, and reduces the amount of milk left in the claw at the end of the milking. Furthermore, the horizontal portion of the flow passage of the claw top is raised above a level so that milk would not fill up the flow passage. This facilitates maintaining the constant pressure differential to create more smooth and steady milk flow. The dividing wall of the claw bottom is configured to keep milk directed from the inlets spaced on opposites of the longitudinal axis from intermingling. The intermingling of the milk may cause splashing within the milking claw which would agitate the milk and break down the fatty globules in the milk which would otherwise cause the degradation of the milk. The raised knob within the sump is positioned below the vertical portion of the flow passage of the outlet is configured to reduce a cross section area of a bottom end of the vertical portion, thereby allowing the vertical portion to draw the milk faster.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1A:
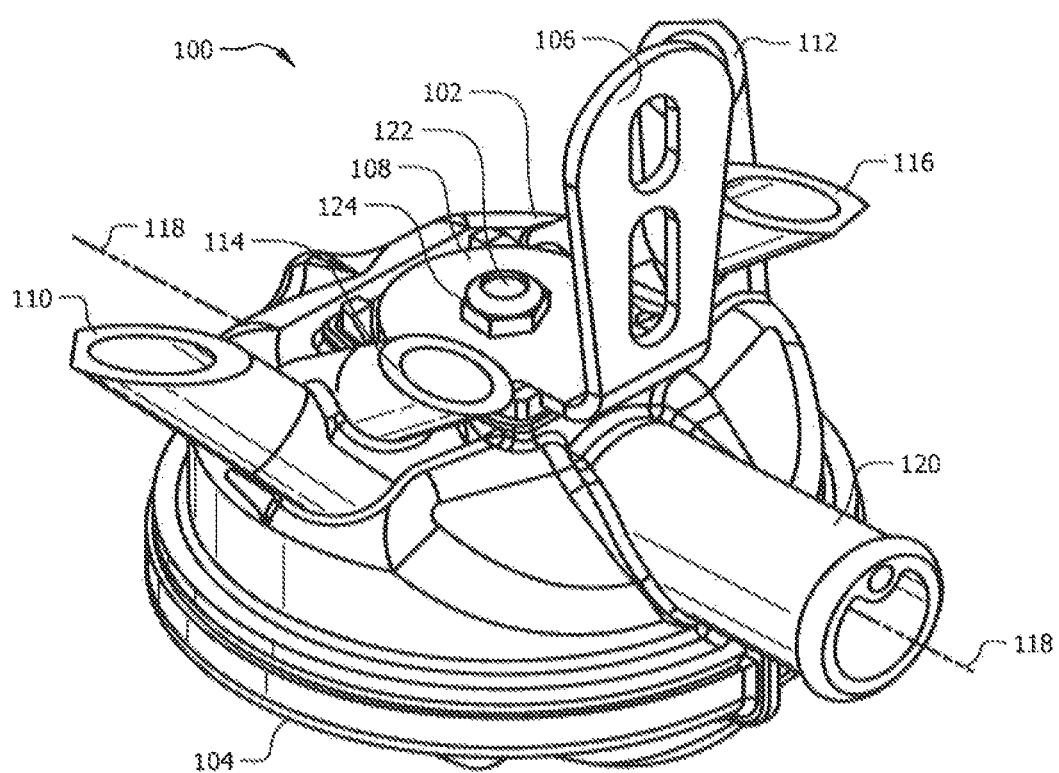
FIG. 1A illustrates a perspective view of a milking claw, according to certain embodiments.
Figure 1B:
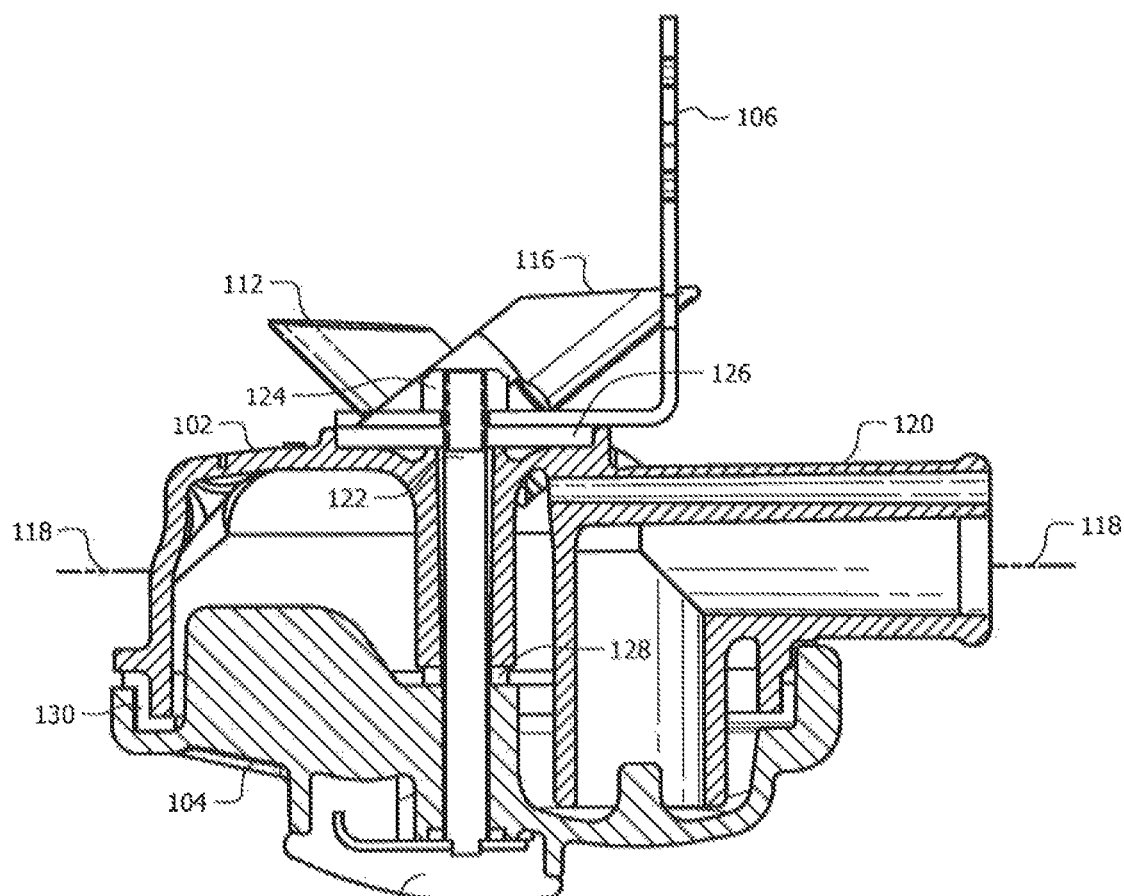
FIG. 1B illustrates a cross-sectional side view of the milking claw of FIG. 1A, according to certain embodiments.

FIGS. 1A and 1B illustrate a perspective view and a cross-sectional side view of a milking claw 100 respectively, according to certain embodiments of the present disclosure. Generally, milking claw 100 is part of a milking cluster which is an assembly attached to a dairy animal's udder during milking. The milking cluster may include other components such as milk lines, milk tubes, and air tubes connecting to the milking claw 100, among others. As illustrated in FIGS. 1A and 1B, milking claw 100 includes a claw top 102, a claw bottom 104, a hook 106, a horizontal flange 108, a central shank bolt 122, a nut 124, a compression gasket 126, a central sealing gasket 128, an outer sealing gasket 130, and a bottom rubber bumper 132. The claw top 102 and claw bottom 104 both have a bow-like structure. The bowl-like structure of the claw top 102 and the claw bottom 104 may each have a diameter of approximately 4 inches. In other alternative embodiments, the claw top 102 and the claw bottom 104 may have any other appropriate sizes. The milking claw 100 is assembled such that the bowl-like structure of the claw top 102 is disposed with the opening down and coupled to the bowl-like structure of the claw bottom 104. In some embodiments, each of the claw top 102 and the claw bottom 104 is manufactured using an injection molding technique. In some embodiments, each of the claw top 102 and the claw bottom 104 is made of metal, such as aluminum and steel. In some alternative embodiments, each of the claw top 102 and the claw bottom 104 is made of plastic. In yet other embodiments, each of the claw top 102 and the claw bottom 104 is made of any other appropriate material.

Figure 2A:
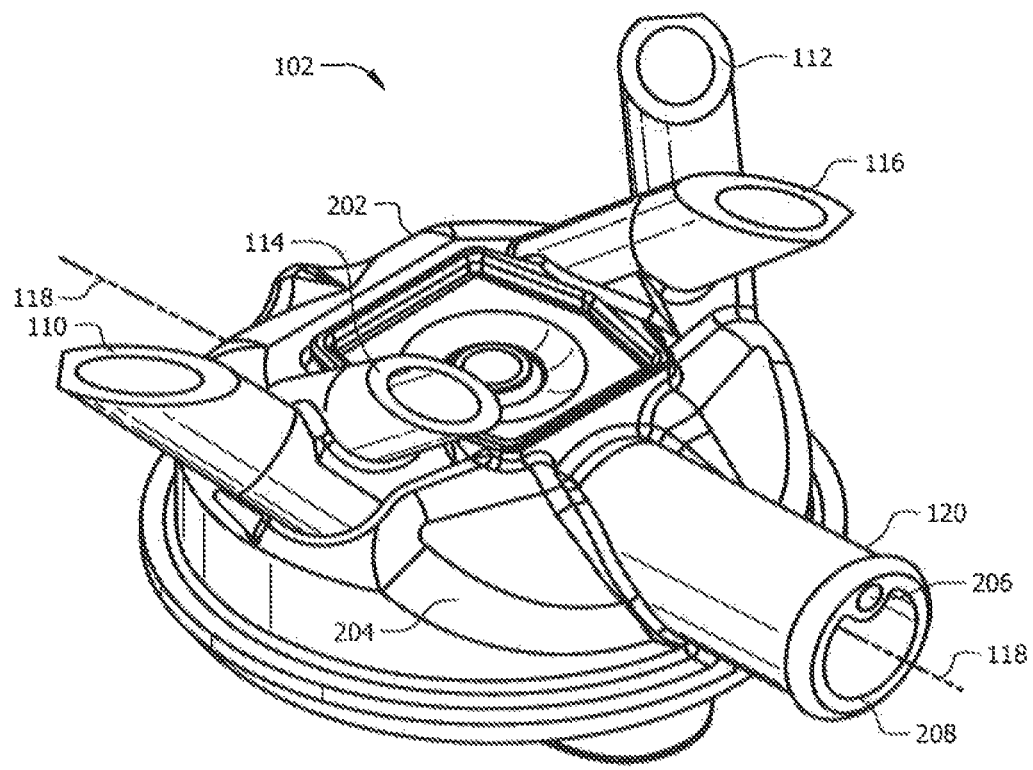
FIG. 2A illustrates a perspective view of a claw top, according to certain embodiments.

As illustrated in FIG. 1A, the claw top 102 includes a pair of front inlets 110, 112, a pair of rear inlets 114, 116, and an outlet 120. The outlet 120 lies along a longitudinal axis 118 of the milking claw 100. The pair of front inlets 110 and 112 are disposed on a top surface of the claw top 102 and are laterally spaced on opposite sides of the longitudinal axis 118. Referring to FIG. 2A, in some embodiments, each of the pair of front inlets 110 and 112 has a tubular structure. Each of the front inlets 110 and 112 may have an inner diameter of approximately 0.37 inches. In other alternative embodiments, each of the pair of front inlets 110 and 112 may have any appropriate shapes or structures or sizes. The pair of front inlets 110 and 112 extend upwardly from the top surface of the claw top 102 and positioned partially above a front half 202 of the claw top 102. In some embodiments, the pair of front inlets 110 and 112 are inclined towards the front half 202 of the claw top 102. Each of the front inlets 110 and 112 may have an angle of 46° with respect to a vertical direction. In other alternative embodiments, the pair of front inlets 110 and 112 may have any appropriate orientations. The pair of front inlets 110 and 112 are configured to draw milk into the milking claw 100. As noted before, milking claw 100 is provided for dairy animal, such as a cow, having four teats including a pair of laterally spaced front teats and a pair of laterally spaced rear teats. The pair of front inlets 110 and 112 are configured to receive milk from a pair of front teats of a cow and direct such milk rearwardly into the milking claw 100. For example, the pair of front inlets 110 and 112 may direct the milk into a rear half 204 of the claw top 102.

Like the pair of front inlets 110 and 112, in some embodiments, each of the pair of rear inlets 114 and 116 has a tubular structure. Each of the rear inlets 114 and 116 may have an inner diameter of approximately 0.38 inches. In other alternative embodiments, each of the pair of rear inlets 114 and 116 may have any appropriate shapes or structures or sizes. The pair of rear inlets 114 and 116 are disposed on the top surface of the claw top 102 and are laterally spaced on opposite sides of the longitudinal axis 118. The pair of rear inlets 114 and 116 extend upwardly from the top surface of the claw top 102 and positioned partially above the rear half 204 of the claw top 102. As opposed to the pair of front inlets 110 and 112, the pair of rear inlets 114 and 116 are inclined towards the rear half 204 of the claw top 102. Each of the rear inlets 114 and 116 may have an angle of 52° with respect to a vertical direction. In other alternative embodiments, the pair of rear inlets 114 and 116 may have any appropriate orientations. The pair of rear inlets 114 and 116 are configured to receive milk from a pair of rear teats of a cow and direct such milk into the milking claw 100. For example, the pair of rear inlets 114 and 116 may direct the milk into the front half 202 of the claw top 102.

Note that the pair of front inlets 110 and 112 may have a lateral spacing that is larger than the lateral spacing between the pair of rear inlets 114 and 116. The wider spacing of the pair of front inlets 110 and 112 is desirable to accommodate the wider spacing of a cow's front teats. Likewise, the narrower spacing of the pair of rear inlets 114 and 116 is desirable to accommodate the smaller lateral spacing between the pair of front inlets 110 and 112. In some embodiments, the interior of the claw top 102 maintain separate milk flow paths from each of the four inlets 110, 112, 114, 116 as the milk flow adheres to the interior surface of the claw top 102 until the milk flow reaches the bottom of the claw bottom 104 at a reduced flow rate and with reduced agitation.

Figure 2B:
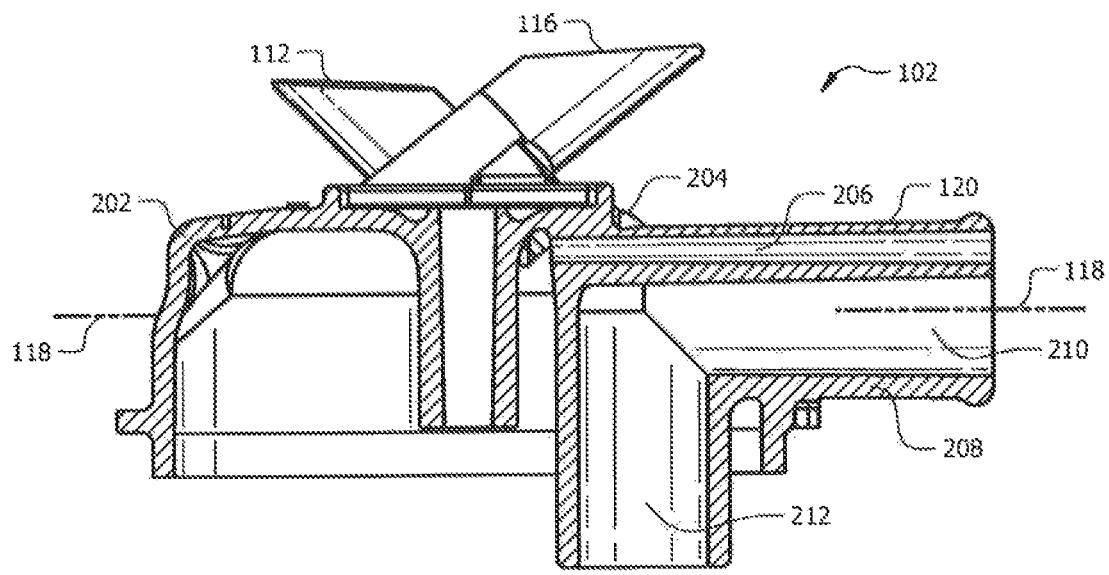
FIG. 2B illustrates a cross-sectional side view of the claw top of FIG. 2B, according to certain embodiments.

The claw top 102 further includes an outlet 120 disposed at the rear half 204 of the claw top 102. The outlet 120 is subject to vacuum from a vacuum source (not shown) for drawing milk out of the milking claw 100. Referring to FIG. 2B, the outlet 120 of the claw top 102 includes an air channel 206 and a flow passage 208. In some embodiment, the air channel 206 has a narrow tubular structure and lies along a direction parallel to the longitudinal axis 118 of the claw top 102. In some alternative embodiments, the air channel 206 may have any other appropriate shape or structure. The air channel 206 is configured to draw air out of the milking claw 100. By drawing air out of the milking claw 100, the air channel 206 enables maintaining vacuum stability in the milking claw 100. For example, a milk line (not shown) connected to the outlet 120 may have milk slugs flowing through the milk line. Without the air channel 206, the milk slugs in the milk line create fluctuation of pressure inside the milk line which further creates fluctuation of pressure differential between the milking claw 100 and the milk line. As noted before, the fluctuation of pressure differential may cause milk to be drawn from the milking claw 100 in higher volume but less frequent slugs. The higher volume but less frequent slugs in turn slow down the milk flowing from the milking claw 100 to the milk line, thereby decreasing the milking efficiency of the milking claw 100. To improve the efficiency of milking claw 100, the air channel 206 may draw air from the milking claw 100 into the milk line. Accordingly, the milk slugs in the milk line may be reduced or even eliminated to keep the constant pressure differential between the inside of the milking claw 100 and the outside of the milking claw 100. The constant pressure differential forces the milk out of the outlet 120 in smaller, more frequent slugs of milk as opposed to higher volume less frequent slugs, so that milk flows more smoothly and more steadily. This more frequent taking away of the milk creates a more stable vacuum inside milking the claw 100, which reduces the amount of milk left in the milking claw 100 at the end of the milking.

The outlet 120 of the claw top 102 further includes a flow passage 208 disposed below the air channel 206. The flow passage 208 is configured to draw milk out of the milking claw 100. Referring to FIG. 2B, in some embodiments, the flow passage 208 includes a horizontal portion 210 and a vertical portion 212. In some embodiments, the horizontal portion 208 lies along the longitudinal axis 118 and has a tubular structure. In some alternative embodiments, the horizontal portion 208 may have any appropriate shape or structure. The horizontal portion 210 is disposed below and parallel to the air channel 206. The vertical portion 212 is disposed partially below the horizontal portion 210 and coupled to an end of the horizontal portion 210. In some embodiments, the vertical portion 212 has a tubular structure. In some alternative embodiments, the vertical portion 212 may have any appropriate shape or structure. The vertical portion 212 is perpendicular to the horizontal portion 210 so that the horizontal portion 210 and the vertical portion 212 form an L-shaped structure. Such structure facilitates raising the horizontal portion 210 of the flow passage 208 above a level so that milk would not fill up the horizontal portion 210. This further helps reduce milk slugs in the horizontal portion 210 and/or milk line connected to the outlet 120 and facilitates maintaining the constant pressure differential to create more smooth and steady milk flow. Note that even when milk blocks all the flow passage 208, the air channel 206 facilitates moving air out of the milking claw 100 to create vacuum in the milking claw 100, which further helps maintaining the constant pressure differential.

Figure 3A:
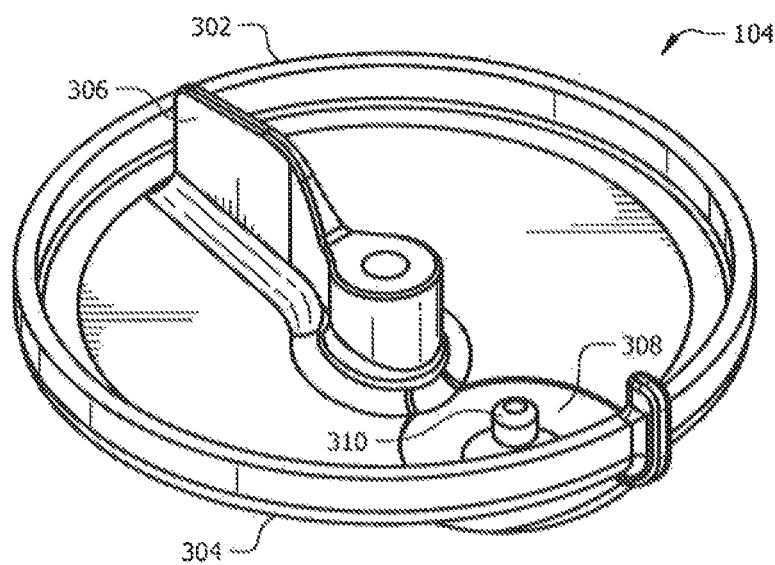
FIG. 3A illustrates a perspective view of a claw bottom, according to certain embodiments.
Figure 3B:
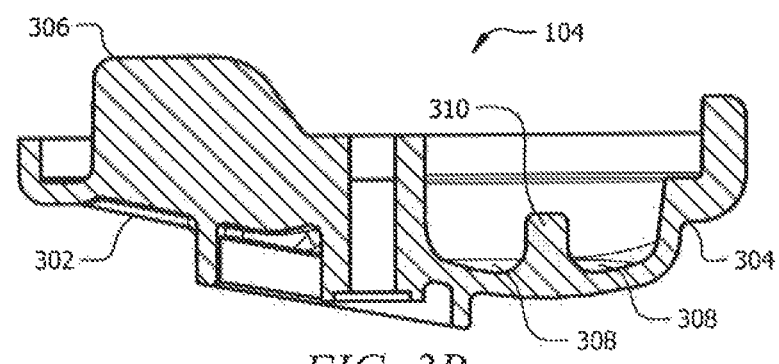
FIG. 3B illustrates a cross-sectional side view of the claw bottom of FIG. 3A, according to certain embodiments.

As noted before, the claw top 102, including the pair of front inlets 110 and 112, the pair of rear inlets 114 and 116, and the outlet 120, is disposed above and coupled to the claw bottom 104 to form the milking claw 100. Referring to FIGS. 3A and 3B, the claw bottom 104 includes a dividing wall 306, a sump 308, and a raised knob 310. Note that like the claw top 102, the claw bottom 104 also includes a front half 302 and a rear half 304. The front half 302 of the claw bottom 104 is positioned approximately below the front half 202 of the claw top 102. The rear half 304 of the claw bottom 104 is positioned approximately below the rear half 204 of the claw top 102.

The dividing wall 306 of the claw bottom 104 is disposed on an inner surface of the claw bottom 104. Specifically, the dividing wall 306 is disposed on an inner surface of the front half 302 of the claw bottom 104 and has a thin wall structure. Referring to FIG. 1B, the wall structure of the dividing wall 306 may extend upwardly, at least partially into the claw top 102. The dividing wall 306 may have a trapezoid structure having a top length of approximately 1 inch, a bottom length of approximately 1.5 inches, a width of approximately 0.2 inches, and a height of approximately 0.84 inches. In other alternative embodiments, the dividing wall 306 may have any other appropriate shapes or sizes. Referring back to FIG. 3A, in some embodiments, the dividing wall 306 extends at least partially through the front half 302 of the claw bottom 104 along a direction parallel to the longitudinal axis 118. In this way, the dividing wall 306 of the claw bottom 104 is configured to keep milk directed from the pair of rear inlets 114 and 116 from intermingling in the front half 302 of the claw bottom 104. The intermingling of the milk may cause splashing within the milking claw 100 which would agitate the milk and break down the fatty globules in the milk which can cause the degradation of the milk.

Claw bottom 104 further includes a sump 308 disposed in the rear half 304 of the claw bottom 104. In some embodiments, the sump 308 generally has a round shape and a sunken structure. For example, the sump 308 is disposed at a lower level than the surrounding area on the inner surface of the rear half 304 of the claw bottom 104. The sump 308 may have a diameter of approximately 1.2 inches. The sump 308 may have a height difference between the lowest point and the highest point of approximately 0.16 inches. In some alternative embodiments, the sump 308 may have any appropriate shapes or structures or sizes. Note that the claw bottom 104 is configured as a sloped structure so that milk directed from the inlets 110, 112, 114 and 116 can flow from the front half 302 to the rear half 304 of the claw bottom 104. With such configuration of the claw bottom 104, the sump 308 can accumulate the milk flowing from the front half 302 to the rear half 304 of the claw bottom 104. The sump 308 is positioned partially below the vertical portion 212 of the flow passage 208 in the claw top 102. A raised knob 310 is disposed in an area within the sump 308.

The raised knob 310 may be disposed approximately in a central area of the sump 308. In some embodiments, the raised knob 310 has a round lump structure. The raised knob 301 may have a height of approximately 0.33 inches and a diameter of approximately 0.24 inches. In some alternative embodiments, the raised knob 310 has any appropriate shapes or structures or sizes. In some embodiments, the raised knob 310 extends at least partially upwardly into the vertical portion 212 of the flow passage 208 in the claw top 102 and partially fills a bottom end of the vertical portion 212. The raised knob 310 is configured to reduce a cross sectional area of the bottom end of the vertical portion 212. This allows the vertical portion 212 to pick up the milk accumulated in the sump 308 faster.

The milking claw 100 further includes a hook 106, a horizontal flange 108, a central shank bolt 122, a nut 124, a compression gasket 126, a central sealing gasket 128, an outer sealing gasket 130, and a bottom rubber bumper 132. The hook 106 generally lies in a vertical direction and is configured to allow hanging the milking claw 100 when not in use. The horizontal flange 108 is disposed on the top surface of the claw top 102 and coupled to the hook 106. The horizontal flange 108 is configured to compress against and retain a compression gasket 126 compressively bearing against the claw top 102. Central sealing gasket 128 and outer sealing gasket 130 are provided between claw top 102 and claw bottom 104. Claw bottom 104 may have a rubber bumper 132 attached to a bottom surface of the claw bottom 104. Central shank bolt 122 is configured to couple the claw top 102 to the claw bottom 104 and is retained by a nut 124.

In operation, the four inlets 110, 112, 114, and 116 of the claw top 102 draw milk into the milking claw 100 from the teats of a cow. For example, the pair of front inlets 110 and 112 receive milk from a pair of front teats of the dairy livestock and direct such milk rearwardly into a rear half 204 of the claw top 102. The pair of rear inlets 114 and 116 receive milk from a pair of rear teats of the dairy livestock and direct such milk forwardly into a front half 202 of the claw top 102. The milk directed by the pair of front inlets 110 and 112 further flows to a rear half 304 of the claw bottom 104 into the sump 308. The milk directed by the pair of rear inlets 114 and 116 further flows to a front half 302 of the claw bottom 104. In the front half 302 of the claw bottom 104, the milk is separated by the dividing wall 306 disposed on the claw bottom 104 and further flows down to the rear half 304 of the claw bottom 104 into the sump 308.

The milk accumulates in the sump 308 and rises to a level of the bottom end of the vertical portion 212 of the flow passage 208 in the claw top 102. Due to the raised knob 310 extending into the vertical portion 212, a cross sectional area of the bottom end of the vertical portion 212 is reduced, which causes the vertical portion 212 to pick up the milk accumulating in the sump 308 faster than when there is no raised knob 310 in the sump 308. The milk keeps rising in the vertical portion 212 of the flow passage 208 and rises to the level of the horizontal portion 210 of the flow passage 208. The horizontal portion 210 then directs the milk out of the flow passage 208. The air channel 206 above the horizontal portion 210 draws air out from the milking claw 100, which facilitates maintaining vacuum stability in the milking claw 100. As noted before, air channel 206 facilitates keeping the constant pressure differential between the inside of the milking claw 100 and the outside of the milking claw 100. The constant pressure differential forces the milk out of the outlet 120 in smaller, more frequent slugs of milk as opposed to higher volume less frequent slugs, so that milk flows more smoothly and more steadily. This more frequent taking away of the milk creates a more stable vacuum inside the milking claw 100, and reduces the amount of milk left in the milking claw 100 at the end of the milking. Furthermore, the horizontal portion of the flow passage of the claw top is raised above a level so that milk is less likely to fill up the flow passage 208. This facilitates maintaining a constant pressure differential to create more smooth and steady milk flow.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A milking claw, comprising:
a claw top comprising:
a pair of front inlets disposed on a top surface of the claw top and configured to draw milk into the milking claw, the pair of front inlets extending upwardly from the top surface of the claw top and inclined towards a front half of the claw top, wherein the pair of front inlets are spaced on opposite sides of a longitudinal axis of the claw top;
a pair of rear inlets disposed on the top surface of the claw top and configured to draw milk into the milking claw, the pair of rear inlets extending upwardly from the top surface of the claw top and inclined towards a rear half of the claw top, wherein the pair of rear inlets are spaced on opposite sides of the longitudinal axis of the claw top; and
an outlet disposed at the rear half of the claw top and comprising:
an air channel along a direction parallel to the longitudinal axis and configured to draw air out of the milking claw; and
a flow passage disposed below the air channel and configured to draw milk out of the milking claw, the flow passage comprising a horizontal portion and a vertical portion, wherein the horizontal portion is parallel to the air channel, wherein the vertical portion is perpendicular to the horizontal portion; and
a claw bottom disposed below the claw top and comprising:
a dividing wall disposed on an inner surface of a front half of the claw bottom, wherein the dividing wall extends extending at least partially through the front half of the claw bottom along a direction parallel to the longitudinal axis;
a sump disposed on an inner surface of a rear half of the claw bottom and positioned at least partially below the vertical portion of the flow passage of the claw top; and
a raised knob disposed in an area within the sump, the raised knob extending upwardly at least partially into the vertical portion of the flow passage.

2. The milking claw of claim 1, wherein:
the pair of front inlets are disposed at least partially above the front half of the claw top; and
the pair of rear inlets are disposed at least partially above the rear half of the claw top.

3. The milking claw of claim 1, wherein:
the pair of front inlets are configured to accommodate a pair of front teats of a dairy livestock; and
the pair of rear inlets are configured to accommodate a pair of rear teats of the dairy livestock.

4. The milking claw of claim 1, wherein a first lateral spacing between the pair of front inlets is wider than a second lateral spacing between the pair of rear inlets.

5. The milking claw of claim 1, wherein:
the pair of front inlets are configured to direct milk rearwardly into the rear half of the claw top; and
the pair of rear inlets are configured to direct milk forwardly into the front half of the claw top.

6. The milking claw of claim 1, wherein the pair of rear inlets are configured to direct milk to opposite sides of the dividing wall.

7. The milking claw of claim 1, wherein the dividing wall is configured to reduce intermingling and agitation of milk in the claw bottom.

8. The milking claw of claim 1, wherein the claw bottom is sloped to promote milk flowing from the front half of the claw bottom to the rear half of the claw bottom.

9. The milking claw of claim 1, wherein the raised knob is configured to reduce a cross-sectional area of the bottom end of the vertical portion of the flow passage.

10. A claw top, comprising:
a bowl-like body with an opening pointing downwardly;
a pair of front inlets disposed on a top surface of the bowl-like body and configured to draw milk into the bowl-like body, the pair of front inlets extending upwardly from the top surface of the bowl-like body and inclined towards a front half of the bowl-like body, wherein the pair of front inlets are spaced on opposite sides of a longitudinal axis of the claw top;
a pair of rear inlets disposed on the top surface of the bowl-like body and configured to draw milk into the bowl-like body, the pair of rear inlets extending upwardly from the top surface of the bowl-like body and inclined towards a rear half of the bowl-like body, wherein the pair of rear inlets are spaced on opposite sides of the longitudinal axis of the claw top; and
an outlet disposed at the rear half of the bowl-like body and comprising:
an air channel along a direction parallel to the longitudinal axis and configured to draw air out of the bowl-like body; and
a flow passage disposed below the air channel and configured to draw milk out of the bowl-like body, the flow passage comprising a horizontal portion and a vertical portion, wherein the horizontal portion is parallel to the air channel, wherein the vertical portion is perpendicular to the horizontal portion.

11. The claw top of claim 10, wherein:
the pair of front inlets are disposed at least partially above the front half of the bowl-like body; and
the pair of rear inlets are disposed at least partially above the rear half of the bowl-like body.

12. The claw top of claim 10, wherein:
the pair of front inlets are configured to accommodate a pair of front teats of a livestock; and
the pair of rear inlets are configured to accommodate a pair of rear teats of the livestock.

13. The claw top of claim 10, wherein a first lateral spacing between the pair of front inlets is wider than a second lateral spacing between the pair of rear inlets.

14. The claw top of claim 10, wherein:
the pair of front inlets are configured to direct milk rearwardly into the rear half of the bowl-like body; and
the pair of rear inlets are configured to direct milk forwardly into the front half of the bowl-like body.

15. A claw bottom, comprising:
a bowl-like body with an opening pointing upwardly;
a dividing wall disposed on an inner surface of a front half of the bowl-like body, wherein the dividing wall extends at least partially through the front half of the bowl-like body along a direction parallel to a longitudinal axis of the claw bottom;
a sump disposed on an inner surface of a rear half of the bowl-like body and positioned partially below a flow passage of a claw top; and
a raised knob disposed in an area within the sump, the raised knob extending upwardly at least partially into the flow passage of the claw top.

16. The claw bottom of claim 15, wherein the dividing wall is configured to reduce intermingling and agitation of milk in the claw bottom.

17. The claw bottom of claim 15, wherein claw bottom is sloped to promote milk flowing from the front half of the bowl-like body to the rear half of the bowl-like body.

18. The claw bottom of claim 15, wherein the raised knob is configured to reduce a cross-sectional area of the bottom end of the flow passage.

* * * * *